United States Patent
Chen et al.

(10) Patent No.: US 12,327,250 B2
(45) Date of Patent: Jun. 10, 2025

(54) MACHINE LEARNING FOR FRAUD TOLERANCE

(71) Applicant: Stripe, Inc., San Francisco, CA (US)

(72) Inventors: Caitlyn Chen, Saratoga, CA (US); Yucheng Tu, Seattle, WA (US); Amr Elroumy, South San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 151 days.

(21) Appl. No.: 17/947,956

(22) Filed: Sep. 19, 2022

(65) Prior Publication Data
US 2024/0095742 A1    Mar. 21, 2024

(51) Int. Cl.
   *G06Q 20/40*    (2012.01)
   *G06N 20/00*    (2019.01)

(52) U.S. Cl.
   CPC ......... *G06Q 20/4016* (2013.01); *G06N 20/00* (2019.01)

(58) Field of Classification Search
   CPC ............................ G06Q 20/4016; G06N 20/00
   USPC ........................................................ 705/35–45
   See application file for complete search history.

(56) References Cited

U.S. PATENT DOCUMENTS

| | | | |
|---|---|---|---|
| 2006/0202012 A1* | 9/2006 | Grano ............... | G06Q 20/042 705/45 |
| 2020/0134628 A1* | 4/2020 | Jia ..................... | G06N 20/00 |
| 2020/0327162 A1* | 10/2020 | Pevtsov ............ | G06F 16/90335 |
| 2020/0364718 A1* | 11/2020 | Hindi ................ | G06Q 20/4016 |
| 2021/0081949 A1* | 3/2021 | Hearty .............. | H04L 63/0853 |
| 2022/0366421 A1* | 11/2022 | Wang ................ | G06Q 30/0185 |
| 2023/0273981 A1* | 8/2023 | Rapowitz ........... | G06F 21/6245 726/4 |
| 2023/0298016 A1* | 9/2023 | Osborn .............. | H04L 63/12 705/41 |
| 2023/0360049 A1* | 11/2023 | Ammatanda ....... | G06Q 30/0201 |
| 2023/0385836 A1* | 11/2023 | Hughes ............. | G06Q 20/4016 |
| 2024/0095742 A1* | 3/2024 | Chen ................. | G06N 20/00 |

* cited by examiner

*Primary Examiner* — Robert R Niquette
(74) *Attorney, Agent, or Firm* — Foley & Lardner LLP

(57) ABSTRACT

In an example embodiment, a solution is provided wherein a machine learning model is to determine a likelihood that a transaction is fraudulent, but also a separate machine learning model is used to determine a suitable threshold for a merchant. This predicted suitable threshold can either be automatically applied to the merchant, or can be recommended to the merchant (allowing the merchant to accept or reject it).

20 Claims, 8 Drawing Sheets

MACHINE LEARNING FOR FRAUD TOLERANCE

TECHNICAL FIELD

The subject matter disclosed herein generally relates to machine learning. More particularly, the subject matter disclosed herein relates to the use of machine learning for fraud tolerance in online networks.

BACKGROUND

Machine learning is used in a wide variety of applications. In some applications, a classifier model, trained through machine learning, is used to output one or more classifications of input data. One such example application is in the field of credit card fraud detection. Online payment systems and payment processors have allowed for many different types of payments to be processed. For example, an online payment system may offer merchants the option to accept credit cards, debit cards, direct money transfers (such as Automated Clearing House (ACH) transactions), Alternative Payment Methods (APMs), also known as Local Payment Methods (LPMs), Single Euro Payments Area (SEPA), etc.

Machine learning may be used to train fraud prevention models that output a score, based on a variety of different input features, reflective of the predicted likelihood that a particular transaction is fraudulent. This score can then be compared to a threshold to determine whether to permit the transaction to proceed or not.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Prior art solutions suffer from a technical problem in that each merchant may have a different risk tolerance. For example, some types of merchants are extremely concerned about fraud, and thus would prefer to have a very low tolerance to allow fraudulent transactions to go through, even at the risk of preventing some legitimate transactions from being processed. In such cases, these merchants may prefer that the threshold level be set to a low value. In other cases, however, some types of merchants are more concerned about growth, and are willing to accept a certain number of fraudulent transactions as long as legitimate transactions are rarely or ever blocked. In such cases, these merchants may prefer that the threshold level be set to a high value.

A further complication, however, is that some merchants may not be fully aware of the consequences of selecting a low or high fraud tolerance threshold, and thus may, for example, accidentally set the threshold lower or higher than they really should, assuming a system allows them to create a customized threshold. What is needed is a mechanism that can suggest or even automatically set a customized threshold for a merchant.

Security of a transaction network may be compromised by various types of fraudulent transactions. As such, a mechanism that reduces the number of fraudulent transactions increases the security of the transaction network. At the same time, some merchants may not wish for growth to be impeded in the name of reducing the number of fraudulent transactions, at least to some extent.

In an example embodiment, a solution is provided wherein a machine learning model is to determine a likelihood that a transaction is fraudulent, but also a separate machine learning model is used to determine a suitable threshold for a merchant. This predicted suitable threshold can either be automatically applied to the merchant, or can be recommended to the merchant (allowing the merchant to accept or reject it).

Figure 1:
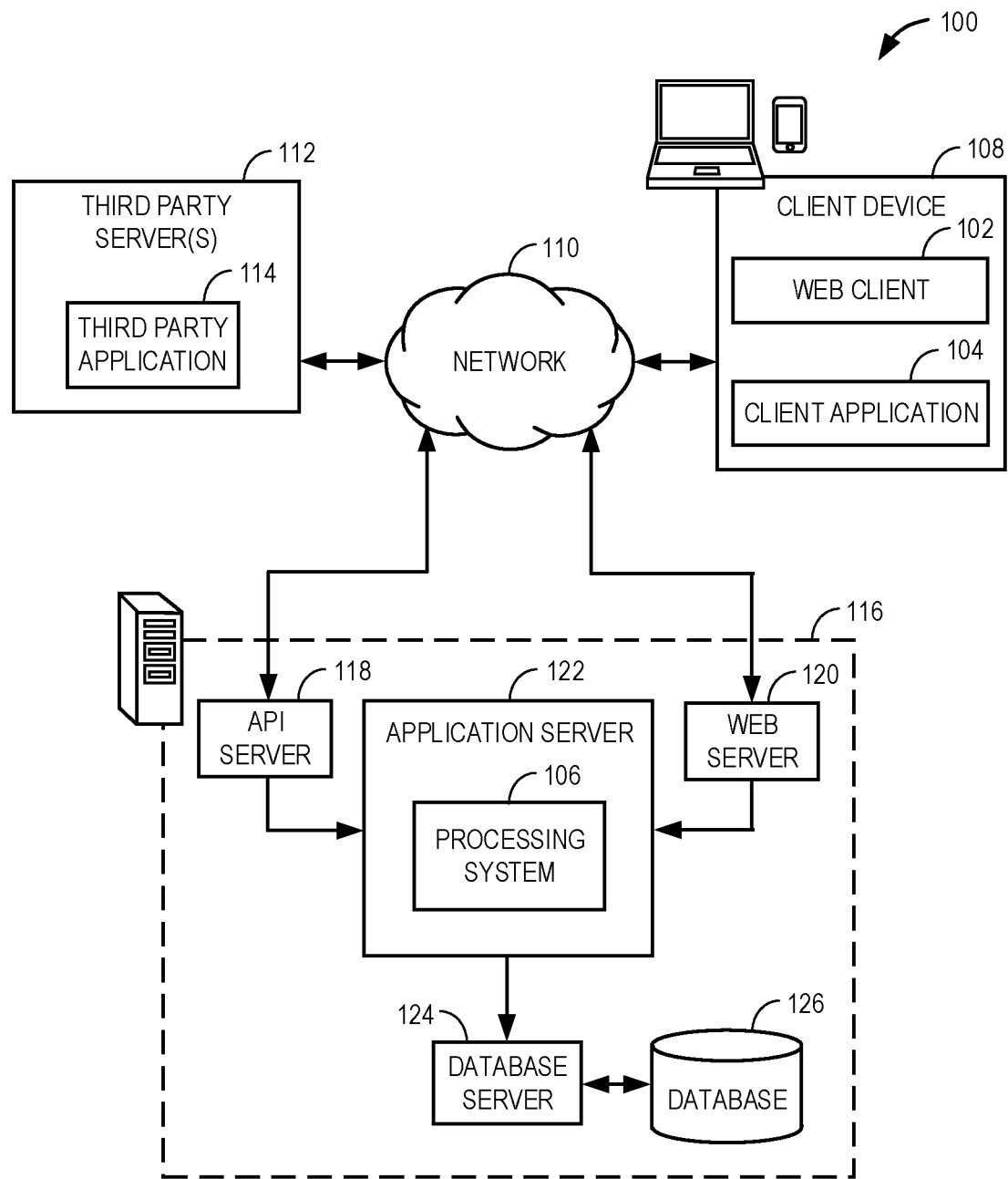
FIG. 1 is a block diagram illustrating a high-level network architecture, according to some example embodiments.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the processing system hosted at https://stripe.com by Stripe, Inc. of San Francisco, CA (herein "Stripe") as an example of a payment processor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the processing system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the processing system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the processing system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the processing system 106) via the web interface supported by the web server 120. Similarly, the client application 104 (e.g., an "app" such as a payment processor app) accesses the various services and functions provided by the processing system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The processing system 106 could also be implemented as a standalone software program, which does not necessarily have networking capabilities.

Figure 2:
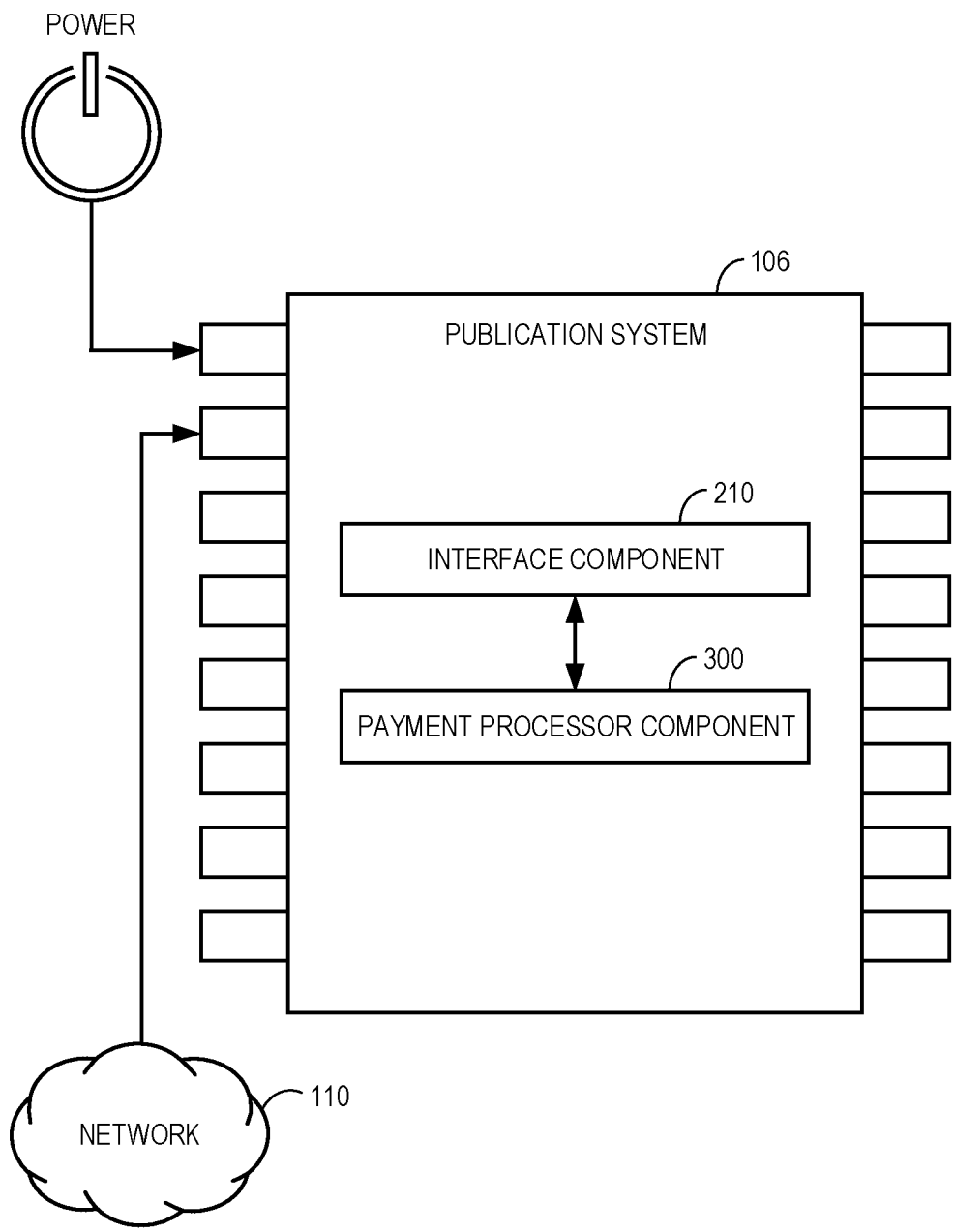
FIG. 2 is a block diagram showing architectural aspects of a processing system, according to some example embodiments.

FIG. 2 is a block diagram showing architectural details of a processing system 106 of FIG. 1, according to some example embodiments. Specifically, the processing system 106 is shown to include an interface component 210 by which the processing system 106 communicates (e.g., over a network 110) with other systems within the SaaS network architecture 100.

Figure 3:
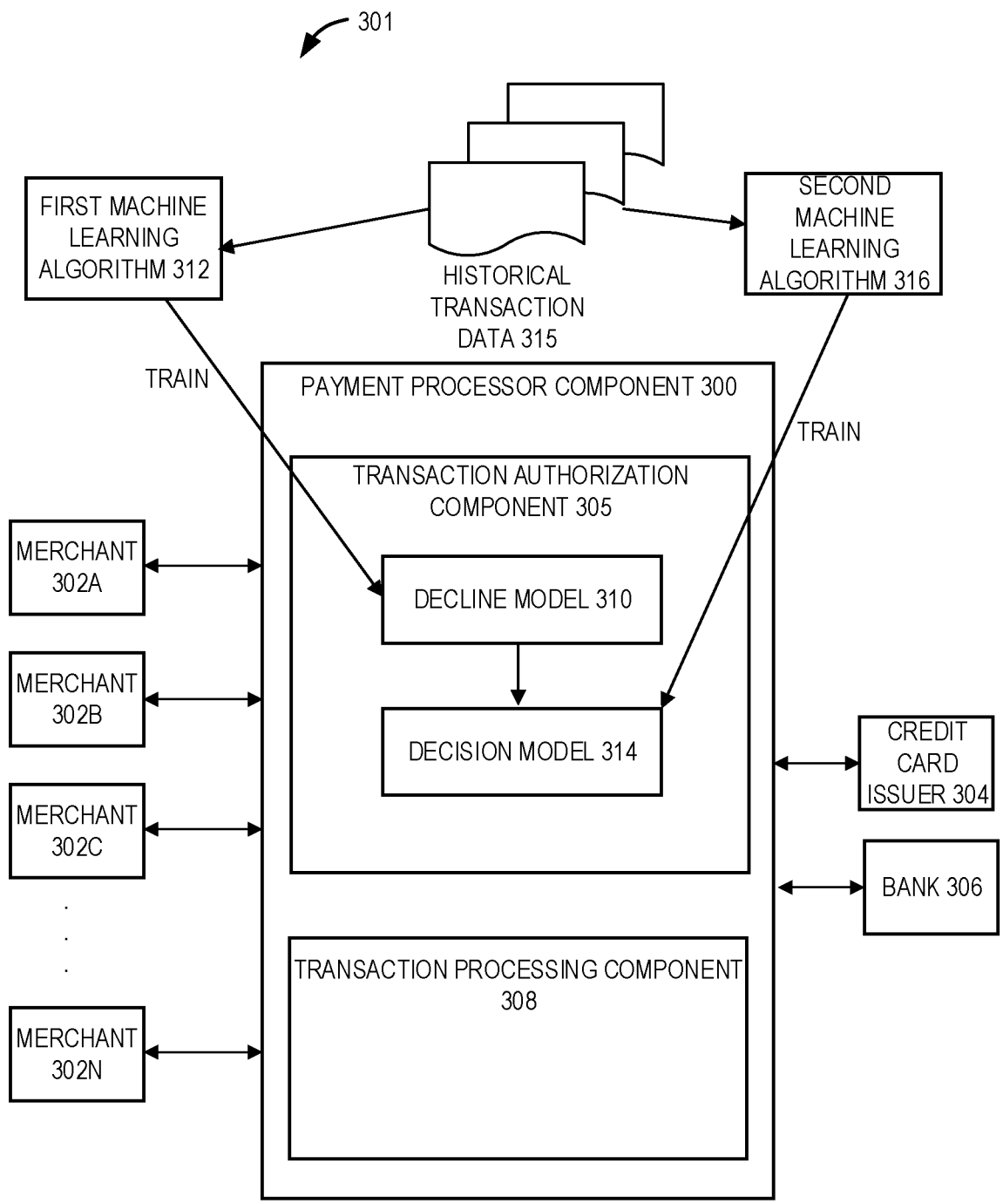
FIG. 3 is a block diagram illustrating a system, according to some example embodiments.

The interface component 210 is communicatively coupled to a payment processor component 300 of FIG. 3 that operates to provide payment processing functions for a payment processor in accordance with the methods described herein with reference to the accompanying drawings.

FIG. 3 is a block diagram illustrating a system 301 in accordance with an example embodiment. The system 301 includes the payment processor component 300 from FIG. 2, which communicates with one or more merchants 302A-302N as well as with credit card issuer 304 and bank 306 via network 110. It should be noted that while only a single credit card issuer 304 and bank 306 are shown here, in actuality the payment processor component 300 may have connections available to many credit card issuers and banks, as well as any other entities necessary to process a transaction using any allowed payment type.

Payment processor component 300 includes a transaction authorization component 305 and a transaction processing component 308. The transaction processing component 308 takes as input information about a potential transaction from a merchant 302A-302N. It then decides whether or not to request validation for the transaction from the credit card issuer 304 and/or bank 306. As will be explained in more detail below, it utilizes a decline model 310 to make this decision. When validation requests are made, they are sent to the credit card issuer 304 and/or bank 306, which then make a final decision as to whether to indicate that the transaction is valid.

Separately, once the potential transaction has been accepted (via an accept on a separate authorization request), the transaction processing component 308 processes the payment itself, via communication with the credit card issuer 304 and/or bank 306.

The decline model 310 is a machine learning model trained by a first machine learning algorithm 312 to predict a likelihood that a particular transaction (of one of a plurality of different payment types) is fraudulent or otherwise malicious. It should be noted that for purposes of the present disclosure, the term "fraudulent" is used broadly to refer to any behavior that is likely to result in the payee not receiving or not being able to keep funds that were designated to be paid to them during the transaction. In other words, it can cover actions that may not meet the legal definition of "fraud," but are still ones that the payee would likely wish to avoid. Thus, for purposes of this disclosure, the term "fraudulent" shall be interpreted to include any negative behavior, whether intentionally malicious or not, that would negatively impact the likelihood of the payee ultimately getting to receive and keep the funds that are a part of the transaction.

The first machine learning algorithm 312 may iterate among various parameters, changing parameters (weights) multiplied by various input variables and evaluating a loss function at each iteration, until the loss function is minimized, at which stage the parameters for that stage are learned. The training data may include labeled data, as described earlier. Specifically, the weights are multiplied by the input variables as part of a weighted sum operation, and the weighted sum operation is used by the loss function.

The first machine learning algorithm 312 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the first machine learning algorithm 312 is a supervised gradient boosted trees algorithm, such as an XG Boost machine learning algorithm. XG Boost supports a gradient boosting algorithm, stochastic gradient boosting, and regularized gradient boosting. It makes efficient use of compute time and memory resources and is sparse-aware (about to automatically handle missing data values), supporting block structure (which allows the parallelization of tree construction), and supporting retraining.

In other example embodiments, the first machine learning algorithm 312 is a deep neural network, or a combination of deep neural network components and XG Boost components.

The decline model 310 can also be retrained by passing new training data, some of which may have been labeled via user feedback, to the first machine learning algorithm at a later time.

Features used by the first machine learning algorithm 312 (as well as by the trained decline model 310) may include, but are not limited to, time features (day of week, hour of day, timezone, etc.), customer data (email address, billing address, time since created, etc.), client data (Internet Protocol address, request headers, browser, operating system, session identification, etc.), card metadata (bank identification number (BIN), bank, country, prepaid, debit or credit, etc.), payment data (amount, currency, shipping address, etc.), and historical counters across many dimensions (card, email address, customer, merchant, IP address, etc.).

In an example embodiment, the output of the decline model 310 is a score indicating a likelihood that the potential transaction is fraudulent. What is then done with that score can depend on the implementation and the merchant. In an example embodiment, a decision model 314 is utilized. This decision model 314 is a machine learned model trained by a second machine learning algorithm 316. The decision model 314 takes as input the score output by the decline model 310 as well as a selected threshold level from a relevant merchant 302A-302N, and may then dynamically adjust the decision model 314 at runtime, effectively adjusting the threshold level (although the decision model 314 itself may not strictly use an adjusted threshold as the decision model 314 need not actually compute a threshold but may make its decision without explicitly computing a threshold), outputting a decision as to whether or not to allow the transaction (or, in some example embodiments, whether or not to override a decision produced by the decline model 310 alone).

In an example embodiment, the decision model 314 may be described as being part of a decision layer, which may be part of a larger model that also includes the decline model 310.

The second machine learning algorithm 316 may iterate among various parameters, changing parameters (weights) multiplied by various input variables and evaluating a loss function at each iteration, until the loss function is minimized, at which stage the parameters for that stage are learned. The training data may include labeled data, as described earlier. Specifically, the weights are multiplied by the input variables as part of a weighted sum operation, and the weighted sum operation is used by the loss function.

The second machine learning algorithm 316 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the second machine learning algorithm 316 is a supervised gradient boosted trees algorithm, such as an XG Boost machine learning algorithm. XG Boost supports a gradient boosting algorithm, stochastic gradient boosting, and regularized gradient boosting. It makes efficient use of compute time and memory resources and is sparse-aware (about to automatically handle missing data values), supporting block structure (which allows the parallelization of tree construction), and supporting retraining.

In other example embodiments, the second machine learning algorithm is a deep neural network, or a combination of deep neural network components and XG Boost components.

The decision model 314 can also be retrained by passing new training data, some of which may have been labeled via user feedback, to the second machine learning algorithm 316 at a later time.

Features used by the second machine learning algorithm 316 (as well as by the trained decision model 314) may include, but are not limited to, time features (day of week, hour of day, timezone, etc.), customer data (email address, billing address, time since created, etc.), client data (Internet Protocol address, request headers, browser, operating system, session identification, etc.), card metadata (bank identification number (BIN), bank, country, prepaid, debit or credit, etc.), payment data (amount, currency, shipping address, etc.), and historical counters across many dimensions (card, email address, customer, merchant, IP address, etc.).

As mentioned above, the decision model 314 may take as input a selected fraud tolerance threshold from a relevant merchant 302A-302N. In an example embodiment, these thresholds are completely configurable by the merchants 302A-302N, based on their own tolerance for potential fraud. Certain companies, for example, may value growth above the bottom line and may be less concerned about losing money to fraudulent transactions than in creating friction for transactions, and thus may wish for their thresholds to be set higher. Additionally, the thresholds need not be the same for all transactions of the merchant. Any variable of a transaction can be used as a basis for a particular setting for a threshold. For example, a merchant may set lower thresholds for ACH transactions than credit card transactions, due to the increased chance of fraud. The merchant can also set higher thresholds for low value transactions (e.g., less than $100) than for high value transactions.

By making the thresholds configurable by the merchants, the overall security of the transaction network is increased, as each merchant is able to feel comfortable that their own tolerance for fraudulent transactions is being independently considered, in contrast to networks where a single threshold for all merchants is used, and merchants with very low tolerance for fraudulent transactions feel less secure because the threshold is set in a manner that attempts to placate all merchants, including those who have a high tolerance for fraudulent transactions.

Furthermore, in an example embodiment, either historical transaction data or potential transaction data (or both) may be transformed and/or enriched prior to use as either retraining data or input to the model at runtime. This may include, for example, normalizing addresses to known addresses, augmenting a raw IP address with a geographical location, and adding indicators that the transaction was performed via a VPN or from a known bot IP address to the transaction data.

In an example embodiment, the decision model 314 utilizes merchant segmentation in its processing. Specifically, merchants may be placed into segments of low, medium, and high fraud tolerance, informed by characteristics such as industry, funding status, and estimated profit margins. This information may be incorporated as features from the historical transaction data 315 and/or derived from other sources, such as public databases (e.g., Securities and Exchange Commission (SEC) filings databases).

High fraud tolerance segments may include, for example, merchants that are funded startups, in early stages, or in high margin industries. Low fraud tolerance segments may include, for example, merchants in low margin industries such as groceries, food and drink, and deliveries.

The decision model 314 may be trained to classify a merchant into a fraud tolerance segment based partially on the merchant's explicit preference but also partially based on maximizing a revenue optimization function. This may be accomplished using the historical transaction data 315, which can be utilized during the training of the decision model 314 to select parameters for merchants based on merchant information, the parameters being selected based on which parameters would maximize revenue for the corresponding merchant. This allows fraud tolerance parameters used by a particular merchant to influence fraud tolerance parameters used by another, similar, merchant. For example, merchant A may have a significant amount of historical transaction data 315, which may be used during the training of the decision model 314 to assign values to parameters that cause the fraud tolerance threshold for merchant A to be set to a level that maximizes revenue overall for merchant A (at least for the historical transaction data 315 it was trained on). At runtime, however, a transaction may be evaluated for merchant B, who may not have had historical transaction data 315 used to train the decision model 314, or at least had less historical transaction data 315 such that the prediction by the decision model might have otherwise been unreliable if it were limited to using only merchant B's historical transaction data 315. Nevertheless, since merchant B is similar (e.g., similar industry, funding status, etc.) to merchant A, the decision model 314 may utilize the parameters from merchant A for merchant B, or at least have such parameters influence the parameters for merchant B. Put another way, the decision model 314 classifies merchant B as being in the same fraud tolerance segment as merchant A based on information known about merchant B and the merchants in the various fraud tolerance segments.

Furthermore, as mentioned briefly above, in an example embodiment, the decision model 314 is periodically retrained using new historical transaction data 315. Included in this new historical transaction data 315 may be the results of transactions that themselves were allowed by the combination of the decline model 310 and the decision model 314.

Thus, the decision model 314 is able to be trained based on the results of its prior performance. Specifically, if the decline model 314 assigned a merchant to a high fraud tolerance segment based on a presumed revenue optimization, and then allowed certain transactions to proceed based on this high fraud tolerance segment, but it turned out that a higher number of fraud disputes were initiated on such transactions than was anticipated, then this actual data on actual revenue could be used to retrain the decline model 314, possibly causing the merchant to be reassigned to a medium fraud tolerance segment. In that manner, the thresholds are dynamically adjusted.

In an example embodiment, this retraining of the decision model 314 is facilitated by organizing the historical transaction data 315 into episodes. Each episode represents a customer's transactions over a period of time for a merchant. This may be a combination of a payment identifier (such as a credit card number) and a merchant identifier. These episodes may be collected from scoring events from the decline model 310. The following are example episodes:

| | t0 | t1 | t2 |
|---|---|---|---|
| Customer 0:<br>card = 1234<br>merchant = abc | state__00<br>action = allow -><br>reward | state__01<br>action = block -><br>reward | state__02<br>action = block -><br>reward |
| Customer 1:<br>card = 1234<br>merchant = abc | | state__11<br>action = block -><br>reward | |

In the example above, customer 0 has three transactions and customer 1 has only one. Their episodes will look as follow in the data sets:

state__00, action=allow, reward | state__01, action=block, reward | state__02, action=block | state__02, action=no__op, reward=0

In a further example embodiment, a sampling strategy is used to sample episodes rather than using all of them. Specifically, episodes may be downsampled where (1) all events are true negatives; or (2) all events are observed as false positives (blocked by the decline model 310 but nevertheless allowed to proceed) and none were subject to a chargeback.

As mentioned above, in an example embodiment the decision model 314 attempts to optimize on revenues. In other words, given a transaction described by a set of features, the decision model 314 aims to maximize cumulative rewards by choosing an appropriate action. The action can be to allow or block the transaction, but can also include future interventions as well (e.g., blocking future transactions from this customer). The reward describes the expected profit or loss as a result of the chosen action, and can also include just the reward from the current transaction or future rewards as well.

The decision model 314 may attempt to optimize both fraud cost and growth value for the immediate transaction only, as follows:

$$\text{Value(allow)} = p(\text{not fraud} \mid \text{allow}) * \ldots - p(\text{fraud} \mid \text{allow}) * \ldots$$
$$= (1-p(\text{fraud})) * (\text{margin}^2 * \text{amount}) - p(\text{fraud}) * ((1-\text{margin}) * \text{amount} + \text{dispute fees}^3)$$
$$\text{Value(block)} = 0$$

Margin may be obtained in a number of different ways, such as by using a default margin, using a per-industry margin, or obtaining actual margin information from the merchant. Dispute fees refers to the cost to the merchant of a customer initiating a dispute, such as a $15 chargeback fee.

In another example embodiment, both the immediate charge and potential future charges and their outcomes are considered:

Value=$\Sigma y\hat{} t$*reward

If the charge is non fraudulent:

Reward=margin*amount

If the charge is fraudulent

Reward=(1-margin)*amount+fees

The total value is the cumulative discounted sum of rewards.
Recall the analytical value functions Value(allow) = p(not fraud | allow) * ... -p(fraud | allow) * ...
= (1-p(fraud)) * (margin$^4$* amount) - p(fraud) * ((1-margin) * amount + fees)
Value(block) = 0

Value(intervention) can be calculated as follows:

Value(intervention) =
p(not fraud, passes intervention | intervention) * (margin * amount) -
p(fraud, passes intervention | intervention) * ((1-margin) * amount + fees) -
Intervention cost An intervention is an action taken on or regarding a potential transaction that affects whether or not the potential transaction is accepted or blocked. While in some systems the possible interventions include only accepting or blocking the potential transactions, in other systems it is possible for interventions to include other actions whose results themselves determine whether to accept or block the potential transaction. For example, one such interaction might be to require additional security verification before accepting the potential transaction, such as requiring the user to take a digital photograph of their photo identification, or utilization of two-factor authentication.

Regardless, one could build two models, one for predicting the probability that the transaction is not fraudulent and an intervention is taken, and one for predicting the probability that the transaction is fraudulent and an intervention is taken. The decision model 314 implementation, however, is able to eliminate the need for building two models as the model itself can simply be retrained. This is beneficial because it saves significant infrastructure cost, engineering time, and allows flexibility into the model, as well as making it easier to test new types of interventions.

Figure 4:
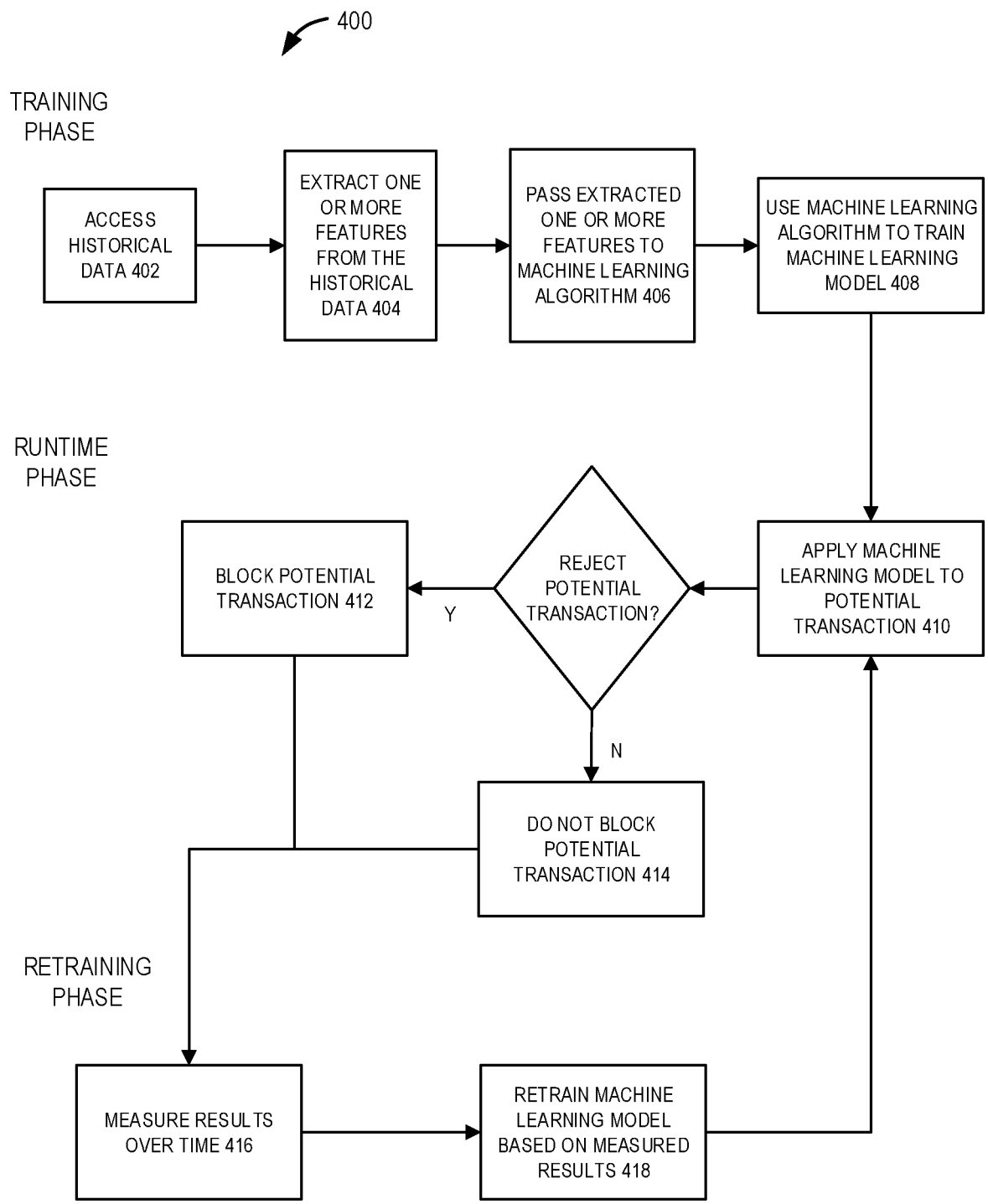
FIG. 4 is a flow diagram illustrating a method of training a machine learning model, according to some example embodiments

FIG. 4 is a flow diagram illustrating a method 400 of using a machine learning model for fraud tolerance thresholding in accordance with an example embodiment. The method 400 may be broken up into training, runtime, and retraining phases, although each of these phases may be continuously performed so that it is quite possible for the system to be training the model while also using the model in runtime.

At operation 402, historical transaction data is accessed. At operation 404, one or more features are extracted from the piece of historical data. At operation 406, the extracted one or more features are passed to a machine learning algorithm along with one or more customized fraud tolerance thresholds. Each of the one or more customized fraud tolerance thresholds may be provided by a different merchant and may reflect a selected fraud tolerance threshold for that merchant. At operation 408, the machine learning algorithm uses the one or more features and the one or more customized fraud tolerance thresholds to train a decision model to decide whether to allow or reject a transaction by determining a segment for a merchant corresponding to a transaction. This may include determining a segment for the merchant that optimizes revenue of the merchant. It should be noted that the training of this decision model includes training the decision model to accept one or more features, such as a decline score, output by a separately trained machine learned model, such as a decline model. The decline model may have thus been separately trained to output the decline score as a prediction of a likelihood that a particular transaction would be fraudulent, albeit this prediction is not based on the merchant segment, which the decision model's prediction is based on. In some example embodiments, the one or more features may be transformed prior to them being used to train the decision model.

At operation 410, the trained machine learning model is applied to a potential transaction to determine whether to accept or reject the potential transaction. This trained machine learning model takes as input a predicted likelihood that the potential transaction is fraudulent from the separately trained decline model, as well as a customized fraud tolerance threshold for the merchant corresponding to the potential transaction. If it is determined that the potential transaction should be rejected, then at operation 412 the potential transaction is blocked. If it is determined that the potential rejection should be allowed, then at operation 414 the potential transaction is not blocked.

When a potential transaction is blocked, the transaction may be prevented from processing. Additionally, a graphical user interface of one or more users may be notified so that they display an indication that the transaction has been blocked. One of these users may be, for example, a transaction initiator, such as a buyer, who then may have the opportunity to attempt a different payment method to complete the transaction. Another of the users may be, for example, a user associated with a merchant who is receiving the transaction.

At operation 416, results of accepting or rejecting potential transactions by the trained machine learning model are measured over time. These results may includes, for example, a measure of how many of the transactions were disputed. At operation 418, the trained machine learning model is retrained based on the measured results, causing a dynamic adjustment in the decision model.

In an alternative embodiment, rather than a decision model being used, customized thresholds are assigned to merchants and used to determine whether to accept or rejection a transaction based on a score output by a decline model alone. Dynamic adjustment of the threshold may be performed directly on these assigned customized thresholds, rather than incorporating the dynamic adjustment into a decision model.

Figure 5:
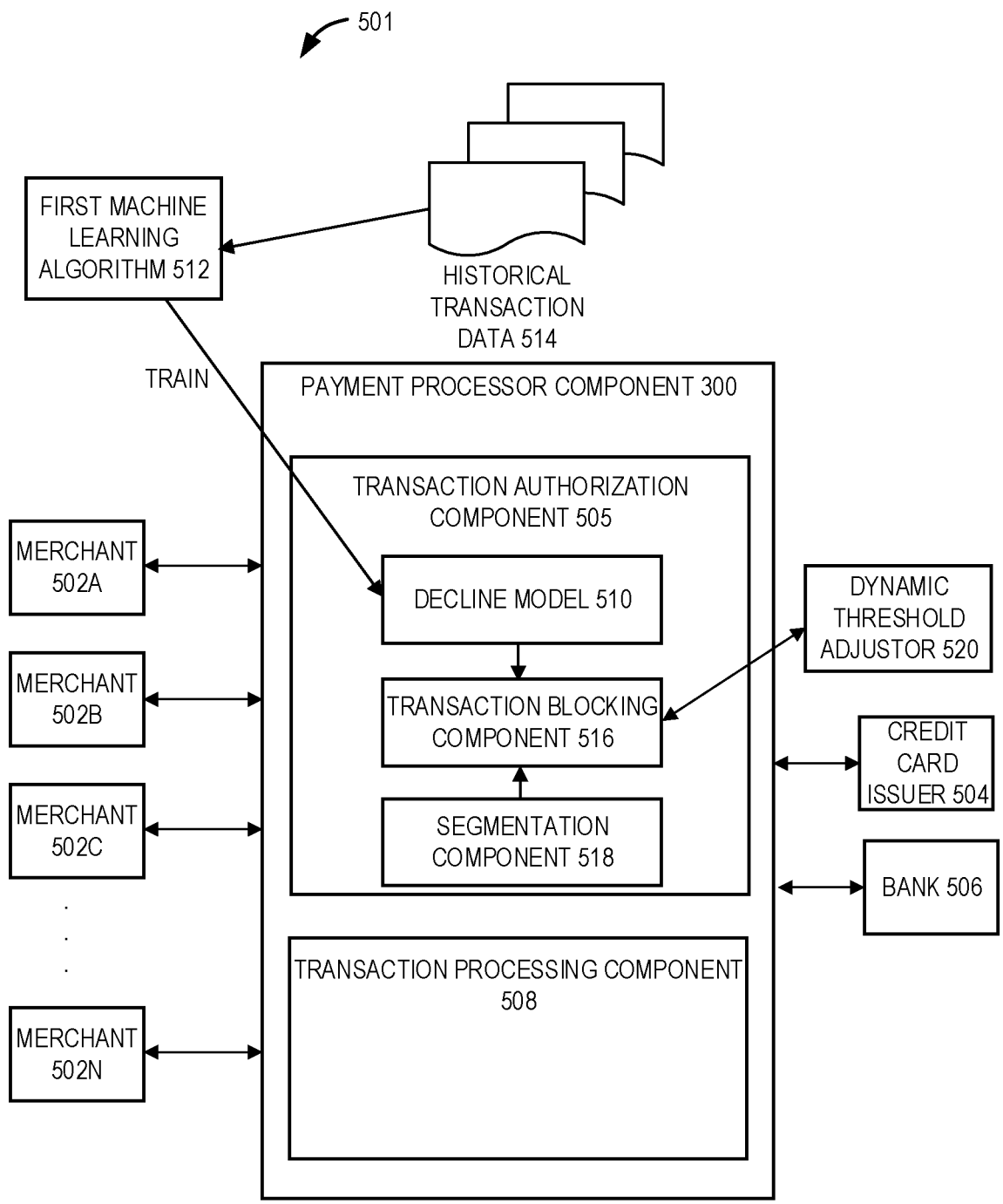
FIG. 5 is a block diagram illustrating a system in accordance with this alternative embodiment.

FIG. 5 is a block diagram illustrating a system 501 in accordance with this alternative embodiment. The system 501 includes the payment processor component 300 from FIG. 2, which communicates with one or more merchants 502A-502N as well as with credit card issuer 504 and bank 506 via network 110.

Payment processor component 300 includes a transaction authorization component 505 and a transaction processing component 508. The transaction processing component 508 takes as input information about a potential transaction from a merchant 502A-502N. It then decides whether or not to request validation for the transaction from the credit card issuer 504 and/or bank 506. When validation requests are made, they are sent to the credit card issuer 504 and/or bank 506, which then make a final decision as to whether to indicate that the transaction is valid.

Separately, once the potential transaction has been accepted (via an accept on a separate authorization request), the transaction processing component 508 processes the payment itself, via communication with the credit card issuer 504 and/or bank 506.

The decline model 510 is a machine learning model trained by a first machine learning algorithm 512 using historical transaction data 514 to predict a likelihood that a particular transaction (of one of a plurality of different payment types) is fraudulent or otherwise malicious.

The first machine learning algorithm 512 may iterate among various parameters, changing parameters (weights) multiplied by various input variables and evaluating a loss function at each iteration, until the loss function is minimized, at which stage the parameters for that stage are learned. The training data may include labeled data, as described earlier. Specifically, the weights are multiplied by the input variables as part of a weighted sum operation, and the weighted sum operation is used by the loss function.

The first machine learning algorithm 512 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the first machine learning algorithm 512 is a supervised gradient boosted trees algorithm, such as an XG Boost machine learning algorithm. XG Boost supports a gradient boosting algorithm, stochastic gradient boosting, and regularized gradient boosting. It makes efficient use of compute time and memory resources and is sparse-aware (about to automatically handle missing data values), supporting block structure (which allows the parallelization of tree construction), and supporting retraining.

In other example embodiments, the first machine learning algorithm 512 is a deep neural network, or a combination of deep neural network components and XG Boost components.

The decline model 510 can also be retrained by passing new training data, some of which may have been labeled via user feedback, to the first machine learning algorithm at a later time.

Features used by the first machine learning algorithm 512 (as well as by the trained decline model 510) may include, but are not limited to, time features (day of week, hour of day, timezone, etc.), customer data (email address, billing address, time since created, etc.), client data (Internet Protocol address, request headers, browser, operating system, session identification, etc.), card metadata (bank identification number (BIN), bank, country, prepaid, debit or credit, etc.), payment data (amount, currency, shipping address, etc.), and historical counters across many dimensions (card, email address, customer, merchant, IP address, etc.).

In an example embodiment, the output of the decline model 510 is a score indicating a likelihood that the potential transaction is fraudulent. A transaction blocking component 516 then compares the score to a fraud tolerance threshold for the appropriate merchant (i.e., the merchant corresponding to the transaction being considered). If the score exceeds the threshold, then the transaction is blocked. If the score does not exceed the threshold, then the transaction is not blocked.

The transaction blocking component 516 may obtain the customized fraud tolerance threshold for the merchant from a segmentation component 518. The segmentation component 518 assigns the merchant to a particular segment based on information about the merchant.

Specifically, merchants may be placed into segments of low, medium, and high fraud tolerance, informed by characteristics such as industry, funding status, and estimated profit margins. This information may be incorporated as features from the historical transaction data 514 and/or derived from other sources, such as public databases (e.g., Securities and Exchange Commission (SEC) filings databases).

High fraud tolerance segments may include, for example, merchants that are funded startups, in early stages, or in high margin industries. Low fraud tolerance segments may include, for example, merchants in low margin industries such as groceries, food and drink, and deliveries.

It should be noted that in some example embodiments, the segment assigned to a merchant is not actually used by the transaction blocking component 516 in some circumstances. For example, some merchants may be large enough, or have enough past transaction data, to have their own customized threshold that does not depend on grouping the merchant with other merchants into a segment to aid in determining or adjusting the threshold. This will be described in more detail below with respect to FIG. 6.

A dynamic threshold adjuster 520 may measure results of allowing or blocking transactions over time and dynamically adjust the threshold assigned to the merchant, whether it is a per-merchant or a per-segment threshold.

Figure 6:
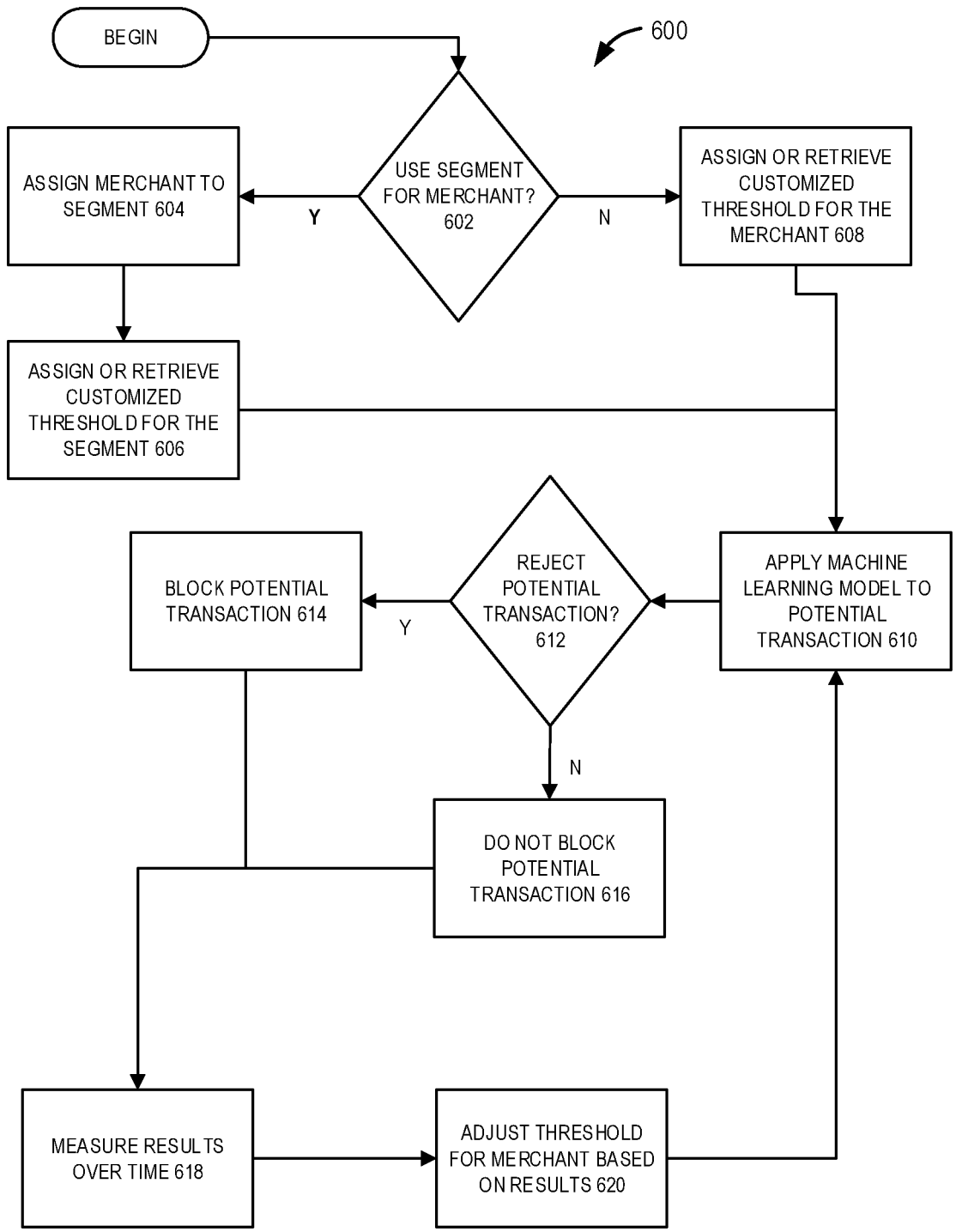
FIG. 6 is a flow diagram illustrating a method for dynamic thresholding in accordance with an example embodiment.

FIG. 6 is a flow diagram illustrating a method 600 for dynamic thresholding in accordance with an example embodiment. At operation 602, it is determined whether to use a segment for a particular merchant. This determination may be based on the size of the merchant and/or the number of historical transactions that are accessible by the system performing the method. For example, if a merchant is extremely large, then a threshold customized specifically for that merchant may be more relevant than one assigned generally to a segment that the merchant might otherwise be assigned to. Likewise, if there is sufficient historical transaction data for a merchant, even if that merchant is small, then it is likelier that any assigned customized merchant-specific threshold would be more relevant to the merchant than a segment-specific threshold. Thus, in a sense, operation 602 is a determination of whether a per-merchant or a per-segment fraud tolerance threshold should be used for the first merchant.

If it is determined that a segment should be used for the particular merchant, then at operation 604 the merchant is assigned to a segment. Specifically, merchants may be placed into segments of low, medium, and high fraud tolerance, informed by characteristics such as industry, funding status, and estimated profit margins. In alternative embodiments, other categories may be used for the segments, and nothing in this disclosure shall be interpreted as limiting the scope of protection to only three segments.

At operation 606, a customized threshold for the segment is assigned or retrieved. Specifically, a threshold for the segment may have been assigned to a previous merchant. In such a case, the threshold may be retrieved and reused for the present merchant. If not, however, a threshold can then be assigned based on the segment. Assigning a threshold based on a segment can be performed in a number of ways. In one example embodiment, a preset threshold is established for each segment, and that preset threshold may be retrieved and used based on the segment. In another example embodiment, the threshold may be dynamically determined based on a rule that uses the segment but also uses other variables as input, such as variables related to the merchant themselves.

If at operation 602 it was determined that a segment should not be used for the particular merchant, then at operation 608 a customized threshold for the merchant is assigned or retrieved. This customized threshold may be one that was established by the merchant themselves.

Either way, however, at operation 610 a first machine learning model is used to determine a likelihood that a transaction of the particular merchant is fraudulent. At operation 612, the likelihood is compared with the customized threshold (whether per-merchant or per-segment) to determine whether to allow or block the transaction. If it is determined at operation 612 that the transaction should be blocked, then at operation 614 it is blocked. If not, then at operation 616 it is not blocked. Blocking the transaction involves performing some action to prevent the transaction from completing. This may include, for example, rejecting the transaction, or reversing the transaction during a reversal time period.

At operation 618, results of the blocking/non-blocking of transactions by operation 612 are measured over time. At operation 620, the threshold for the particular merchant, whether per-merchant or per-segment, is adjusted based on those results. For example, if it turned out that a higher number of fraud disputes were initiated on such transactions than was anticipated, then this actual data on actual revenue could be used to adjust the threshold to reject more transactions in the future. In that manner, the thresholds are dynamically adjusted.

Described implementations of the subject matter can include one or more features, alone or in combination as illustrated below by way of example.

Example 1. A method comprising:
accessing a first machine learning model trained by a first machine learning algorithm, the first machine learning model trained to output a decline score indicative of a probability that a potential transaction is fraudulent;
accessing historical transaction data;
extracting one or more features from the historical transaction data; and
passing the one or more extracted features to a second machine learning algorithm to train a second machine learning model to output a determination of whether to allow or block a potential transaction based on one or more features of the potential transaction, based on a decline score generated for the potential transaction by the first machine learning model and a fraud tolerance threshold assigned to a merchant corresponding to the potential transaction.

Example 2. The method of Example 1, further comprising transforming the one or more features prior to them being passed to the second machine learning algorithm.

Example 3. The method of Examples 1 or 2, further comprising:
evaluating the potential transaction using the second machine learning model; and
in response to a determination that the potential transaction should be blocked, blocking the potential transaction.

Example 4. The method of Example 3, further comprising:
measuring results of the second machine learning algorithm determining whether to allow or block transactions; and
retraining the second machine learning model using the measured results.

Example 5. The method of Example 4, wherein the measured results include a measure of how many of the transactions were disputed.

Example 6. The method of any of Examples 1-5, wherein the second machine learning model is trained to assign a merchant to a segment that optimizes revenue of the merchant.

Example 7. The method of any of Examples 1-6, wherein a segment is a grouping of merchants who share a common fraud tolerance level.

Example 8. A system comprising:
one or more processors; and
at least one memory storing instructions that, when executed by at least one processor among the one or more processors, cause the at least one processor to perform operations comprising:
accessing a first machine learning model trained by a first machine learning algorithm, the first machine learning model trained to output a decline score indicative of a probability that a potential transaction is fraudulent;
accessing historical transaction data;
extracting one or more features from the historical transaction data; and
passing the one or more extracted features to a second machine learning algorithm to train a second machine learning model to output a determination of whether to allow or block a potential transaction based on one or more features of the potential transaction, based on a decline score generated for the potential transaction by the first machine learning model and a fraud tolerance threshold assigned to a merchant corresponding to the potential transaction.

Example 9. The system of Example 8, further comprising transforming the one or more features prior to them being passed to the second machine learning algorithm.

Example 10. The system of Examples 8 or 9, further comprising:
evaluating the potential transaction using the second machine learning model; and
in response to a determination that the potential transaction should be blocked, blocking the potential transaction.

Example 11. The system of Example 10, further comprising:
  measuring results of the second machine learning algorithm determining whether to allow or block transactions; and
  retraining the second machine learning model using the measured results.

Example 12. The system of Example 11, wherein the measured results include a measure of how many of the transactions were disputed.

Example 13. The system of any of Examples 8-12, wherein the second machine learning model is trained to assign a merchant to a segment that optimizes revenue of the merchant.

Example 14. The system of any of Examples 8-13, wherein a segment is a grouping of merchants who share a common fraud tolerance level.

Example 15. A non-transitory machine-readable medium comprising instructions which, when read by a machine, cause the machine to perform operations comprising:
  accessing a first machine learning model trained by a first machine learning algorithm, the first machine learning model trained to output a decline score indicative of a probability that a potential transaction is fraudulent;
  accessing historical transaction data;
  extracting one or more features from the historical transaction data; and
  passing the one or more extracted features to a second machine learning algorithm to train a second machine learning model to output a determination of whether to allow or block a potential transaction based on one or more features of the potential transaction, based on a decline score generated for the potential transaction by the first machine learning model and a fraud tolerance threshold assigned to a merchant corresponding to the potential transaction.

Example 16. The non-transitory machine-readable medium of Example 15, further comprising transforming the one or more features prior to them being passed to the second machine learning algorithm.

Example 17. The non-transitory machine-readable medium of Examples 15 or 16, further comprising:
  evaluating the potential transaction using the second machine learning model; and
  in response to a determination that the potential transaction should be blocked, blocking the potential transaction.

Example 18. The non-transitory machine-readable medium of Example 17, further comprising:
  measuring results of the second machine learning algorithm determining whether to allow or block transactions; and
  retraining the second machine learning model using the measured results.

Example 19. The non-transitory machine-readable medium of Example 18, wherein the measured results include a measure of how many of the transactions were disputed.

Example 20. The non-transitory machine-readable medium of any of Examples 15-19, wherein the second machine learning model is trained to assign a merchant to a segment that optimizes revenue of the merchant.

Figure 7:
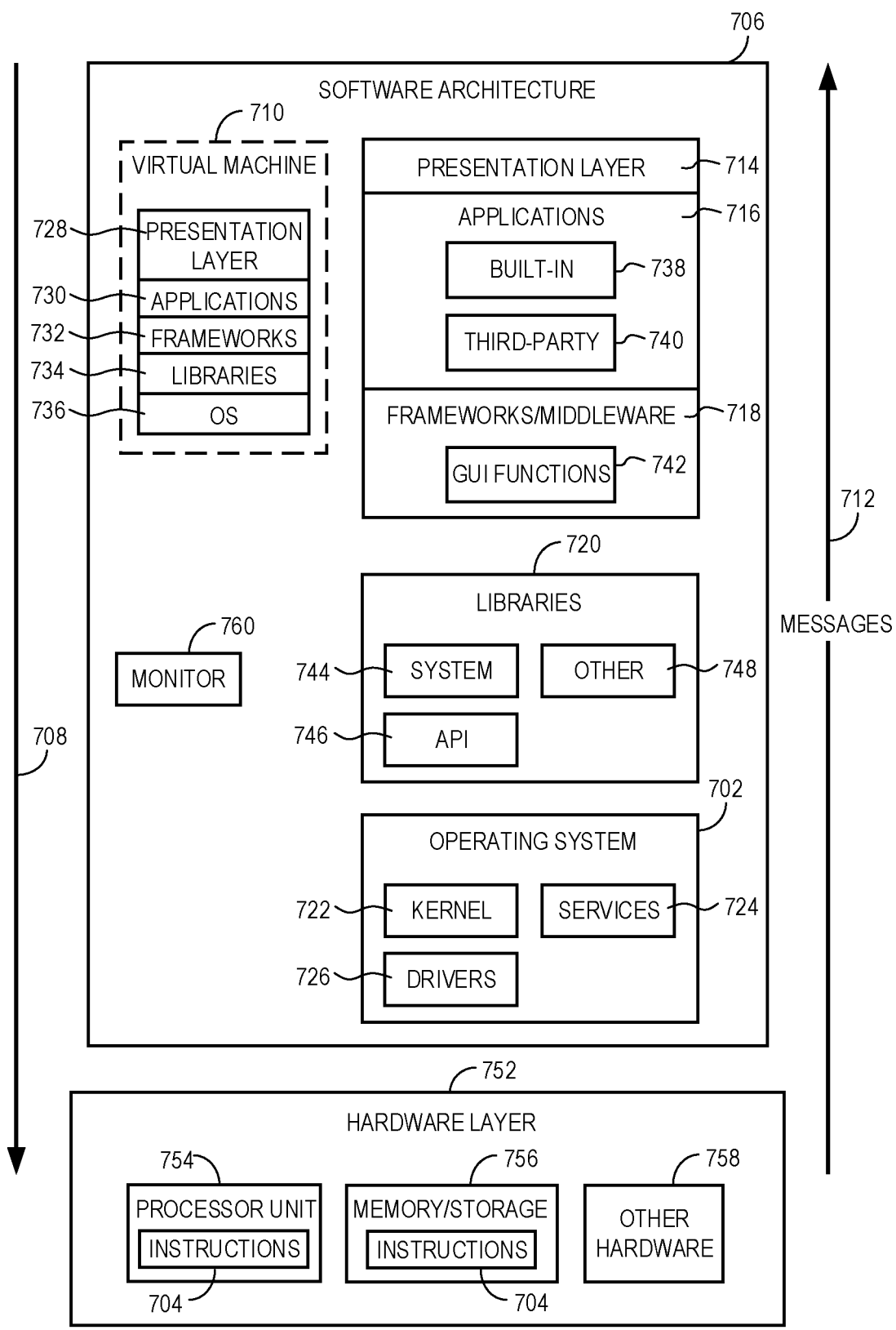
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706, and it will be appreciated that many other architectures may be implemented to facilitate the functionality described herein. The software architecture 706 may execute on hardware such as a machine 800 of FIG. 8 that includes, among other things, processors 804, memory/storage 806, and input/output (I/O) components 818. A representative hardware layer 752 is illustrated and can represent, for example, the machine 800 of FIG. 8. The representative hardware layer 752 includes a processor 754 having associated executable instructions 704. The executable instructions 704 represent the executable instructions of the software architecture 706, including implementation of the methods, components, and so forth described herein. The hardware layer 752 also includes memory and/or storage modules as memory/storage 756, which also have the executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response as messages 712 in response to the API calls 708. The layers illustrated are representative in nature, and not all software architectures have all layers. For example, some mobile or special-purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 7D graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide various graphic user interface (GUI) functions 742, high-level resource management, high-level location services, and so forth. The frameworks/middleware 718 may provide a broad spectrum of other APIs that may be utilized by the applications 716 and/or other software components/modules, some of which may be specific to a particular operating system or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. The third-party applications 740 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 740 may invoke the API calls 708 provided by the mobile operating system (such as the operating system 702) to facilitate functionality described herein.

The applications 716 may use built-in operating system functions (e.g., kernel 722, services 724, and/or drivers 726), libraries 720, and frameworks/middleware 718 to create user interfaces to interact with users of the system. Alternatively, or additionally, in some systems, interactions with a user may occur through a presentation layer, such as the presentation layer 714. In these systems, the application/component "logic" can be separated from the aspects of the application/component that interact with a user.

Some software architectures use virtual machines. In the example of FIG. 7, this is illustrated by a virtual machine 710. The virtual machine 710 creates a software environment where applications/components can execute as if they were executing on a hardware machine (such as the machine 800 of FIG. 8, for example). The virtual machine 710 is hosted by a host operating system (e.g., the operating system 702 in FIG. 7) and typically, although not always, has a virtual machine monitor 760, which manages the operation of the virtual machine 710 as well as the interface with the host operating system (e.g., the operating system 702). A software architecture executes within the virtual machine 710 such as an operating system (OS) 736, libraries 734, frameworks 732, applications 730, and/or a presentation layer 728. These layers of software architecture executing within the virtual machine 710 can be the same as corresponding layers previously described or may be different.

Figure 8:
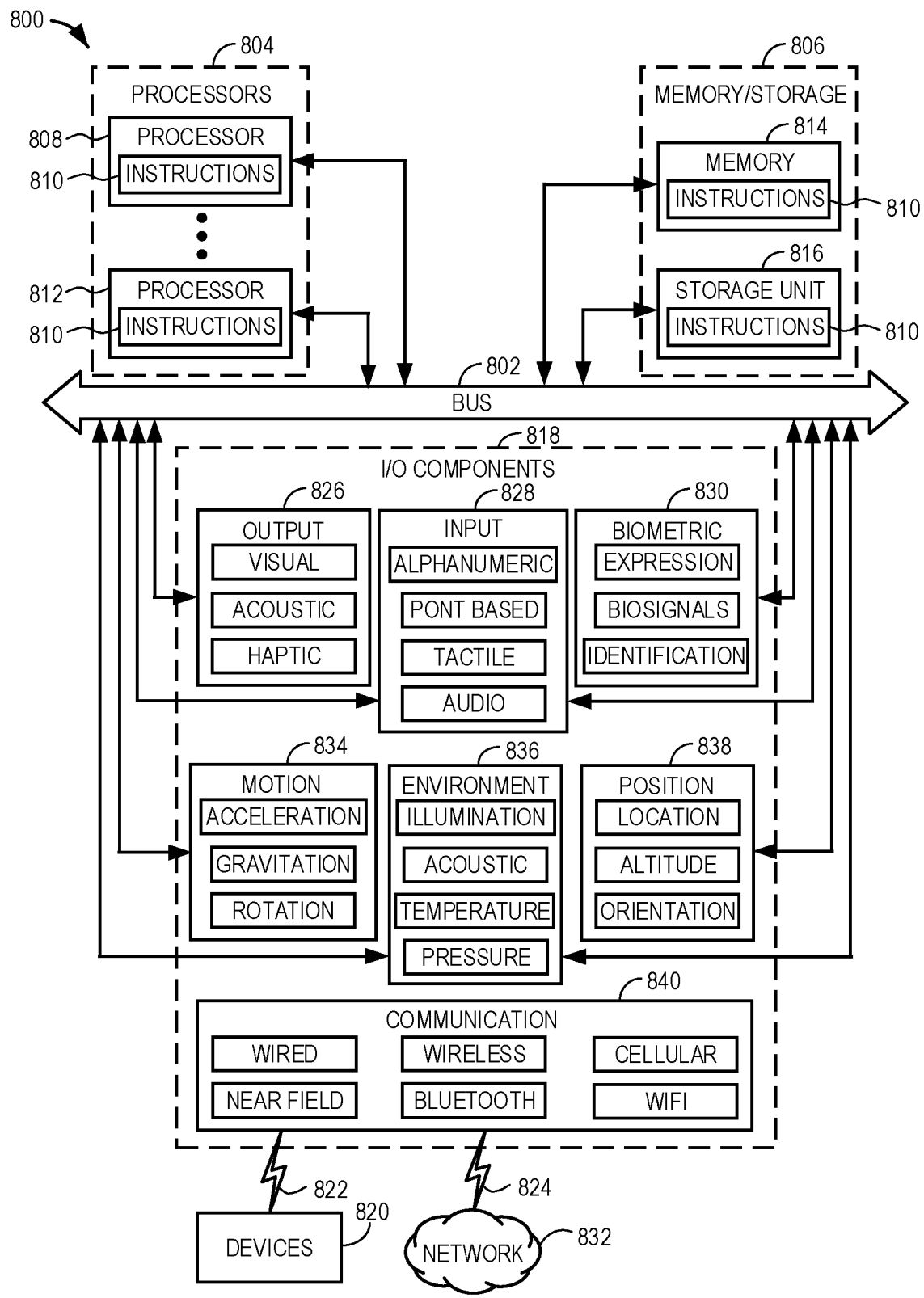
FIG. 8 is a block diagram illustrating components of a machine, according to some example embodiments, that is able to read instructions from a machine-readable medium (e.g., a machine-readable storage medium) and perform any one or more of the methodologies discussed herein.

FIG. 8 is a block diagram illustrating components of a machine 800, according to some example embodiments, that is able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code), for causing the machine 800 to perform any one or more of the methodologies discussed herein, may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804 (including processors 808 and 812), memory/storage 806, and I/O components 818, which may be configured to communicate with each other such as via a bus 802. The memory/storage 806 may include a memory 814, such as a main memory or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of the processors 804 are examples of machine-readable media.

The I/O components 818 may include a wide variety of components to receive input, provide output, produce output, transmit information, exchange information, capture measurements, and so on. The specific I/O components 818 that are included in a particular machine will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion; the grouping is in no way limiting. In various example embodiments, the I/O components 818 may include output components 826 and input components 828. The output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environment components 836, or position components 838, among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 838 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840, operable to couple the machine 800 to a network 832 or devices 820 via a coupling 824 and a coupling 822, respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting an NFC beacon signal that may indicate a particular location, and so forth.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" is a company (often a third party) appointed to handle payment card (e.g., credit card, debit card) transactions. They have connections to various card networks and supply validation and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2022, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   accessing, by a device, historical data associated with historical network operations related to a set of computing infrastructures;
   for each computing infrastructure of the set of computing infrastructures, extracting, by the device, one or more features from the historical data related to the computing infrastructure;
   passing, by the device, the one or more extracted features to a second machine learning algorithm to train a set of instances of a second machine learning model corresponding to each computing infrastructure of the set of computing infrastructures,
      each trained instance of the second machine learning model configured to output a determination of whether to allow or block a potential network operation based on (i) one or more features of the potential network operation, (ii) a decline score generated for the potential network operation by a first machine learning model, and (iii) a fraud tolerance threshold assigned to the computing infrastructure corresponding to the trained instance of the second machine learning model;
   in response to obtaining a request for a first network operation with a first computing infrastructure, accessing, by the device, the first machine learning model trained by a first machine learning algorithm, the first machine learning model trained to output a first decline score indicative of a probability that a potential network operation is fraudulent;
   executing, by the service, a first instance of the second machine learning model corresponding to the first computing infrastructure to evaluate the first network operation, based on the first decline score and a first fraud tolerance threshold assigned to the first computing infrastructure; and
   in response to an indication from the first instance of the second machine learning model that the first network operation should be blocked, blocking, at the device, the first network operation such that the first network operation is prevented from proceeding externally outside of the device for further authentication processing.

2. The method of claim 1, further comprising transforming the one or more features prior to them being passed to the second machine learning algorithm.

3. The method of claim 1, further comprising:
   measuring, by the device, results of the second machine learning algorithm; and
   retraining, by the device, the second machine learning model using the measured results, wherein the measured results include a measure of how many of the network operations were disputed.

4. The method of claim 1, wherein the second machine learning model is trained to assign a computing infrastructure to a segment that optimizes revenue of the computing infrastructure.

5. The method of claim 4, wherein the segment is a grouping of at least a portion of the set of computing infrastructures who share a common fraud tolerance level.

6. The method of claim 1, further comprising, while evaluating the potential network operation using the second machine learning model, dynamically adjusting the second machine learning model to effectively adjust the fraud tolerance threshold at runtime.

7. The method of claim 1, further comprising adjusting the fraud tolerance threshold assigned to the computing infrastructure for the potential network operation based on a feature of the potential network operation.

8. A system comprising:
   one or more processors; and
   at least one memory storing instructions that, when executed by at least one processor among the one or more processors, cause the at least one processor to perform operations comprising:
   accessing historical data associated with historical network operations related to a set of computing infrastructures;
   for each computing infrastructure of the set of computing infrastructures, extracting one or more features from the historical data related to the computing infrastructure;
   passing the one or more extracted features to a second machine learning algorithm to train a set of instances of a second machine learning model corresponding to each computing infrastructure of the set of computing infrastructures,
      each trained instance of the second machine learning model configured to output a determination of whether to allow or block a potential network operation based on (i) one or more features of the potential network operation, (ii) a decline score generated for the potential network operation by a first machine learning model, and (iii) a fraud tolerance threshold assigned to the computing infrastructure corresponding to the trained instance of the second machine learning model;
   in response to obtaining a request for a first network operation with a first computing infrastructure, accessing the first machine learning model trained by a first machine learning algorithm, the first machine learning model trained to output a first decline score indicative of a probability that a potential network operation is fraudulent;
   executing a first instance of the second machine learning model corresponding to the first computing infrastructure to evaluate the first network operation based on the first decline score and a first fraud tolerance threshold assigned to the first computing infrastructure; and
   in response to an indication from the first instance of the second machine learning model that the first network operation should be blocked, blocking the first network operation such that the first network operation is prevented from proceeding externally outside of the device for further authentication processing.

9. The system of claim 8, wherein the instructions further cause the one or more processors to transform the one or more features prior to them being passed to the second machine learning algorithm.

10. The system of claim 8, wherein the instructions further cause the one or more processor to:
   measure results of the second machine learning algorithm; and
   retrain the second machine learning model using the measured results, wherein the measured results include a measure of how many of the network operations were disputed.

11. The system of claim 8, wherein the second machine learning model is trained to assign a computing infrastructure to a segment that optimizes revenue of the computing infrastructure.

12. The system of claim 11, wherein the segment is a grouping of at least a portion of the set of computing infrastructures who share a common fraud tolerance level.

13. The system of claim 8, further comprising, while evaluating the potential network operation using the second machine learning model, dynamically adjusting the second machine learning model to effectively adjust the fraud tolerance threshold at runtime.

14. The system of claim 8, further comprising adjusting the fraud tolerance threshold assigned to the computing infrastructure for the potential network operation based on a feature of the potential network operation.

15. A non-transitory machine-readable medium comprising instructions which, when read by a machine, cause the machine to perform operations comprising:

- accessing historical data associated with historical network operations related to a set of computing infrastructures;
- for each computing infrastructure of the set of computing infrastructures, extracting one or more features from the historical data related to the computing infrastructure;
- passing the one or more extracted features to a second machine learning algorithm to train a set of instances of a second machine learning model corresponding to each computing infrastructure of the set of computing infrastructures,
  - each trained instance of the second machine learning model configured to output a determination of whether to allow or block a potential network operation based on (i) one or more features of the potential network operation, (ii) a decline score generated for the potential network operation by a first machine learning model, and (iii) a fraud tolerance threshold assigned to the computing infrastructure corresponding to the trained instance of the second machine learning model;
- in response to obtaining a request for a first network operation with a first computing infrastructure, accessing the first machine learning model trained by a first machine learning algorithm, the first machine learning model trained to output a first decline score indicative of a probability that a potential transaction is fraudulent;
- executing a first instance of the second machine learning model corresponding to the first computing infrastructure to evaluate the first network operation based on the first decline score and a first fraud tolerance threshold assigned to the first computing infrastructure; and
- in response to an indication from the first instance of the second machine learning model that the first network operation should be blocked, blocking the first network operation such that the first network operation is prevented from proceeding externally outside of the device for further authentication processing.

16. The non-transitory machine-readable medium of claim 15, wherein the instructions further cause the machine to transform the one or more features prior to them being passed to the second machine learning algorithm.

17. The non-transitory machine-readable medium of claim 15, wherein the instructions further cause the machine to:

- measure results of the second machine learning algorithm; and retrain the second machine learning model using the measured results, wherein the measured results include a measure of how many of the network operations were disputed.

18. The non-transitory machine-readable medium of claim 15, wherein the second machine learning model is trained to assign a computing infrastructure to a segment that optimizes revenue of the computing infrastructure.

19. The non-transitory machine-readable medium of claim 15, further comprising, while evaluating the potential network operation using the second machine learning model, dynamically adjusting the second machine learning model to effectively adjust the fraud tolerance threshold at runtime.

20. The non-transitory machine-readable medium of claim 15, further comprising adjusting the fraud tolerance threshold assigned to the computing infrastructure for the potential network operation based on a feature of the potential network operation.

* * * * *